United States Patent
Pappas et al.

(10) Patent No.: US 8,705,630 B2
(45) Date of Patent: Apr. 22, 2014

(54) ADAPTING ONE TYPE OF ENCODER TO ANOTHER TYPE OF ENCODER

(75) Inventors: Derek Pappas, Palo Alto, CA (US); Atul Garg, Sunnyvale, CA (US); Shankar Moni, Bangalore (IN); Harikrishna M. Reddy, San Jose, CA (US); Matthew R. Longnecker, Sunnyvale, CA (US); Christopher L. Mills, Saratoga, CA (US); Ignatius B. Tjandrasuwita, Atherton, CA (US)

(73) Assignee: NVIDIA Corporation, Santa Clara, CA (US)

(*) Notice: Subject to any disclaimer, the term of this patent is extended or adjusted under 35 U.S.C. 154(b) by 1602 days.

(21) Appl. No.: 11/636,104

(22) Filed: Dec. 8, 2006

(65) Prior Publication Data

US 2007/0189390 A1 Aug. 16, 2007

Related U.S. Application Data

(60) Provisional application No. 60/772,440, filed on Feb. 10, 2006.

(51) Int. Cl.
*H04B 1/66* (2006.01)
*H04N 7/12* (2006.01)
*H04N 11/02* (2006.01)
*H04N 11/04* (2006.01)

(52) U.S. Cl.
USPC ............ 375/240.17; 375/240.16; 375/240.12

(58) Field of Classification Search
None
See application file for complete search history.

(56) References Cited

U.S. PATENT DOCUMENTS

| | | | |
|---|---|---|---|
| 6,097,842 A | 8/2000 | Suzuki et al. | |
| 7,092,442 B2* | 8/2006 | Zhang et al. ............. | 375/240.05 |
| 7,167,520 B2* | 1/2007 | Yoshioka et al. ........ | 375/240.21 |
| 7,535,961 B2* | 5/2009 | Cho et al. ................. | 375/240.12 |
| 2002/0044603 A1 | 4/2002 | Rajagopalan et al. | |
| 2002/0064228 A1* | 5/2002 | Sethuraman et al. .... | 375/240.12 |
| 2002/0176500 A1 | 11/2002 | Bakhmutsky et al. | |
| 2004/0013399 A1 | 1/2004 | Horiguchi et al. | |
| 2004/0091049 A1 | 5/2004 | Yamaguchi et al. | |
| 2004/0218626 A1* | 11/2004 | Tyldesley et al. ............. | 370/464 |
| 2005/0201463 A1 | 9/2005 | Lee et al. | |
| 2006/0088104 A1* | 4/2006 | Molloy et al. ........... | 375/240.17 |

FOREIGN PATENT DOCUMENTS

| | | |
|---|---|---|
| EP | 1575301 | 9/2005 |
| EP | 1879388 A1 | 1/2008 |
| JP | 6038243 A2 | 2/1994 |
| JP | 8009385 | 1/1996 |
| JP | 08-046971 A | 2/1996 |

(Continued)

OTHER PUBLICATIONS

Ad hoc group on MPEG-4 video VM editing; MPEG-4 Video Verification Model Version 7.0; Video Group; Bristol, Apr. 1997.

(Continued)

*Primary Examiner* — David Czekaj
*Assistant Examiner* — Kristin Dobbs

(57) ABSTRACT

Described are methods and systems for processing data. A motion estimator uses a block of an input frame of video data and a block of a reference frame of video data to generate motion vectors according to a first encoding scheme. A motion compensator produces half pel motion vectors from the motion vectors according to a second encoding scheme that is different from the first encoding scheme.

20 Claims, 7 Drawing Sheets

(56) References Cited

FOREIGN PATENT DOCUMENTS

| JP | 2001-016594 A | 1/2001 |
|---|---|---|
| JP | 2004-242309 A | 8/2004 |
| WO | 9529561 A1 | 11/1995 |

OTHER PUBLICATIONS

Advanced Video Coding for Generic Audiovisual Services; Series H: Audiovisual and Multimiedia Systems; ITU-T (International Telecommunication Union) Mar. 2005.

IEEE Xplore; DSP-Based Multi-Format Video Decoding Engine for Media Adapter Applications; Yi-Shin Tung, Member, IEEE, Sung-Wen Wang, Chien-Wu Tsai, Ya-Ting Yang, and Ja-Ling Wu, Senior Member, IEEE; Issue Date: Feb. 2005; vol. 51 Issue:1; on pp. 273-280; ISSN: 0098-3063.

ITU-T: Telecommunication Standardization Sector of ITU; H.264 (Mar. 2005); Series H: Audiovisual and Multimedia Systems; Infrastructure of audiovisual services—Coding of moving video; Advanced video coding for generic audiovisual services.

* cited by examiner

ADAPTING ONE TYPE OF ENCODER TO ANOTHER TYPE OF ENCODER

RELATED U.S. APPLICATION

This application claims priority to the copending provisional patent application Ser. No. 60/772,440, entitled "Adapting One Type of Encoder to Another Type of Encoder," with filing date Feb. 10, 2006, assigned to the assignee of the present application, and hereby incorporated by reference in its entirety.

FIELD OF THE INVENTION

Embodiments of the present invention generally relate to data processing. More specifically, embodiments of the present invention relate to encoding (compressing) data such as video data.

BACKGROUND ART

The ability to quickly and efficiently process video streams has grown in importance, with portable consumer electronic products incorporating more and more multimedia features. Mobile phones, for example, can be used to retrieve, view and transmit multimedia content. However, while the capabilities of portable devices continue to increase, such devices are still somewhat limited relative to more powerful platforms such as personal computers. Data transmission and retrieval rates may also be a factor. The amount of image (e.g., video) data is usually more of a consideration than the amount of audio data.

The data is often encoded (compressed) to facilitate storage and streaming, and then decoded (decompressed) for playback (e.g., display). Video data may be compressed using a Moving Pictures Experts Group (MPEG) scheme, for example. By encoding a video sequence, the number of bits needed to represent the video sequence can be greatly reduced.

In a typical video sequence, the content of one frame, or a least a portion of that frame, may be very similar to that of another frame. This is commonly referred to as "temporal redundancy." A compression technique commonly referred to as "motion compensation" is employed to exploit temporal redundancy. If content in a frame is closely related to that of another (reference) frame, it is possible to accurately represent, or predict, the content of the frame using the reference frame.

The frames are partitioned into blocks of pixels (e.g., a macroblock of 16×16 pixels). The movement of a block that, apart from being moved to a different position, is not otherwise transformed significantly from a corresponding block in the reference frame, can be represented using a motion vector. For example, a motion vector of (3,4) can mean that the block has moved three pixels to the left and four pixels upward relative to the position of its corresponding block in the reference frame. Motion compensation refers to the application of a motion vector to a decoded (decompressed) block to construct a new block (or frame or image).

Compression standards continue to evolve, in order to achieve higher compression rates without compromising the quality of the reconstructed video. A recent compression standard that is becoming more widely used is known as H.264 or MPEG-4 Part 10, and is known more formally as Advanced Video Coding (AVC). Earlier standards such as MPEG-4 (which is different from MPEG-4 Part 10) continue to be used.

SUMMARY OF THE INVENTION

The continued use of earlier and still acceptable standards, such as MPEG-4, and the introduction of newer or improved standards, such as H.264, can create a dilemma for manufacturers of consumer electronic devices. Devices designed for one compression scheme may not be able to implement a different compression scheme. This may be particularly true in devices in which encoding is accomplished in hardware. Accordingly, a system and/or method that can readily adapt aspects of one compression scheme (e.g., MPEG-4) to another one (e.g., H.264) would be advantageous. Embodiments in accordance with the present invention provide this and other advantages.

In one embodiment, an H.264 encoder is implemented by adding an H.264 interpolator, including a half pixel (half pel) filter and a data packer module, into an otherwise MPEG-4 encoder pipeline. In one embodiment, the H.264 interpolator is implemented in hardware. The MPEG-4 pipeline is used to compute motion vectors, and the H.264 interpolator is used for motion compensation. The data packer module arranges the output of the motion compensator in a manner suitable for use by a downstream media processor unit (e.g., a digital signal processor), which directs the execution of other encoding processes such as transformation, quantization, inverse transformation and inverse quantization.

The implementation of an H.264 interpolator in hardware in an otherwise MPEG-4 pipeline is accomplished without increasing the number of gates and may reduce power consumption. Such features are particularly beneficial in portable handheld electronic devices such as portable phones, personal digital assistants (PDAs), and handheld gaming devices.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE INVENTION

Figure 1:
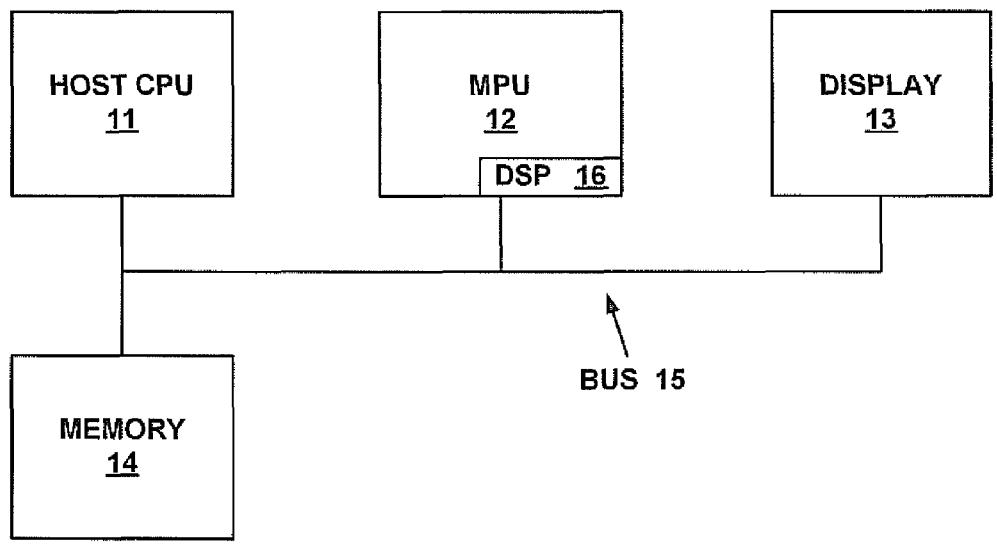
FIG. 1 is a block diagram of one embodiment of a system for encoding data in accordance with the present invention.

Reference will now be made in detail to the various embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "executing," "receiving," "accessing," "computing," "identifying," "decoding," "encoding," "loading," "applying," "removing," "shifting," "storing," "selecting," "arranging," "directing," "generating," "reconstructing," "comparing," "transforming," "quantizing," "fetching" or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

The descriptions and examples provided herein are discussed in the context of video data; however, the present invention is not so limited. The data may be multimedia data; for example, there may be audio data associated with the video data.

FIG. 1 is a block diagram of a system 10 upon which an encoder in accordance with the present invention can be implemented. In the example of FIG. 1, the system 10 includes a host central processing unit (CPU) 11 coupled to a media (e.g., video or graphics) processor unit (MPU) 12 via a bus 15. Both the CPU 11 and the MPU 12 are coupled to a memory 14 via bus 15. In the system 10 embodiment, the memory 14 is a shared memory, whereby the memory 14 stores instructions and data for both the CPU 11 and the MPU 12. Alternatively, there may be separate memories dedicated to the CPU 11 and MPU 12, respectively. The memory 14 can also include a video frame buffer for storing pixel data that drives a coupled display 13.

As shown in FIG. 1, system 10 includes the basic components of a computer system platform that implements functionality in accordance with embodiments of the present invention. System 10 can be implemented as, for example, a number of different types of portable handheld electronic devices. Such devices can include, for example, portable phones, personal digital assistants (PDAs), handheld gaming devices, or virtually any other type of device with display capability. In such embodiments, components can be included that are designed to add peripheral buses, specialized communications components, support for specialized input/output (I/O) devices, and the like.

According to embodiments of the present invention, an H.264 encoder is implemented by inserting an H.264 interpolator into an otherwise MPEG-4 pipeline. The MPEG-4 pipeline computes motion vectors that are used by the H.264 interpolator for motion compensation. In one embodiment, the H.264 interpolator is implemented on the MPU 12. The output of the H.264 interpolator is provided to, for example, a digital signal processor (DSP) 16 that, in one embodiment, is a part of the MPU 12. Additional information regarding the H.264 interpolator is provided in conjunction with FIGS. 2, 3 and 4, below.

Figure 2:
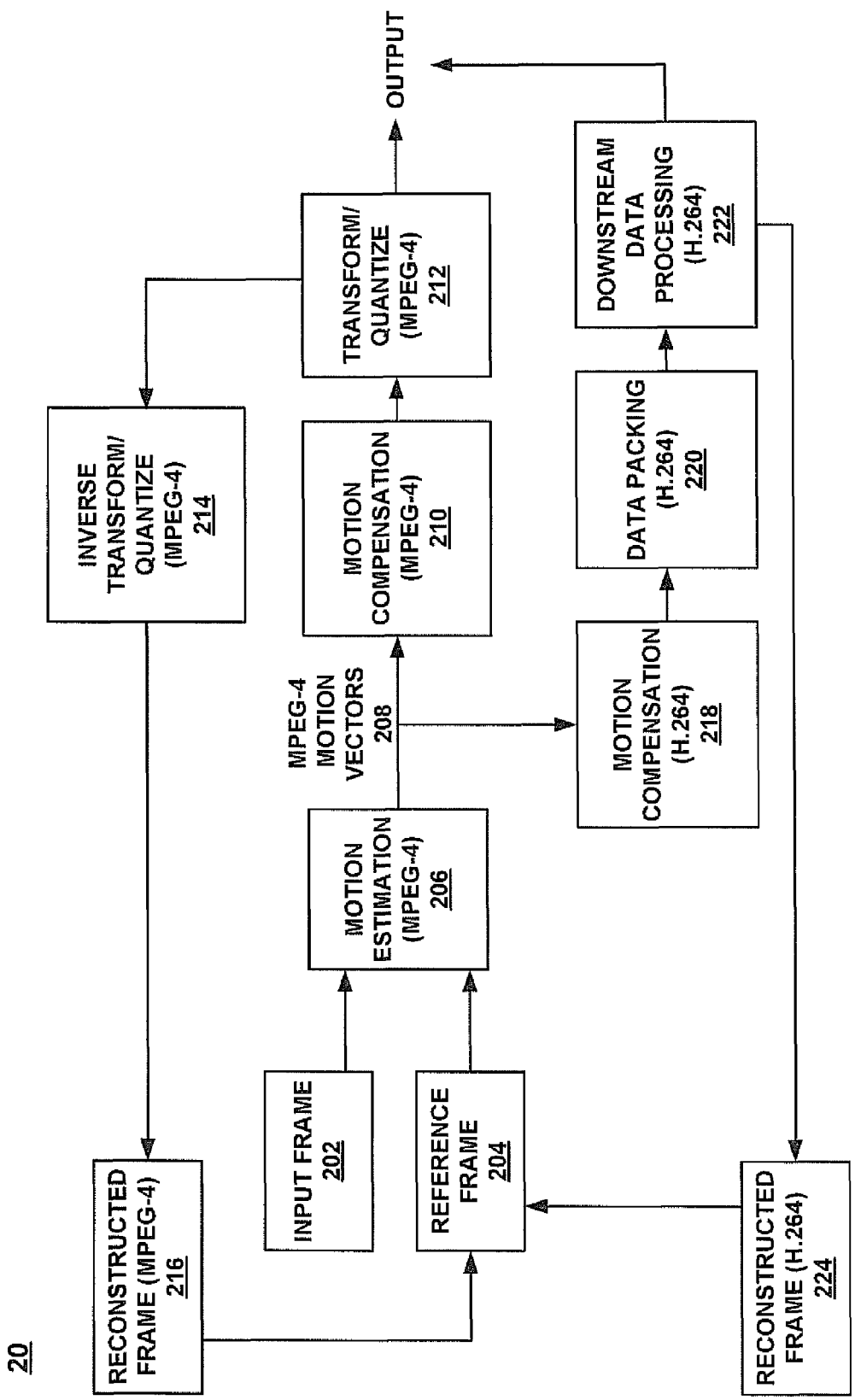
FIG. 2 is a block diagram showing data flow through elements of a process for encoding data according to one embodiment of the present invention.

FIG. 2 is a block diagram showing data flow through elements of a process 20 for encoding video data according to one embodiment of the present invention. The example of FIG. 2 shows some of the more significant processing blocks that are involved with encoding data; however, not all of the processing blocks are shown, and the processing blocks may be performed in an order different than shown. Also, for simplicity of discussion and illustration, not all of the data flow paths between processing blocks are shown.

Significantly, according to embodiments of the present invention, process 20 shows both MPEG-4 and H.264 processing blocks. As mentioned above, elements of an H.264 encoder are inserted into an MPEG-4 pipeline. In overview, the MPEG-4 pipeline is used to generate motion vectors that are in turn used by either an MPEG-4 encoder or an H.264 encoder. That is, downstream of the motion estimation block 206, the motion vectors generated according to MPEG-4 may be used in either an MPEG-4 encoding process or in an H.264 encoding process.

In the example of FIG. 2, the processing blocks that are implemented according to MPEG-4 are identified as such, and the processing blocks that are implemented according to H.264 are similarly identified. Although processing conceivably can be switched from an MPEG-4 mode to an H.264 mode and back again, in practice the process 20 is implemented using either an MPEG-4 encoder or an H.264 encoder. That is, the system 10 is provided with the capability to implement an MPEG-4 encoding scheme and an H.264 encoding scheme; however, when implemented in a consumer electronic device, the manufacturer or vendor may choose to implement only one of the possible encoding schemes.

In the present embodiment, an input (current) frame 202 is presented for encoding. The frame is processed in units of a macroblock (e.g., a 16×16 block of pixels). A prediction macroblock will be formed based on one or more reference frames 204. The reference frame(s) 204 may include a previously encoded frame (the frame encoded immediately preceding the current frame 202, noting that the order of encoding may be different from the order in which the frames are to be displayed), and is selected from other frames that have already been encoded and reconstructed (e.g., reconstructed frame 216 for MPEG-4 mode or reconstructed frame 224 for H.264 mode). In the motion estimation block 206, motion vectors 208 are derived by comparing the input frame 202 and the reference frame(s) 204.

In an MPEG-4 implementation, the motion vectors 208 are used in the motion compensation block 210 to form the prediction macroblock. The prediction macroblock is subtracted from the current macroblock (input frame 202) to produce a residual that is transformed (e.g., discrete cosine transformed) and quantized into a set of coefficients (block 212). The coefficients can be entropy encoded (e.g., Huffman encoded) and, along with other information used for decoding but not central to this discussion, formed into a compressed bitstream, which may be transmitted or stored. Also, the coefficients are decoded in order to reconstruct a frame that can be used to encode other frames. In block 214, the coefficients are inverse quantized and inverse transformed to produce another residual (different from the aforementioned residual), which is added to the prediction macroblock to form a reconstructed macroblock and ultimately a reconstructed frame 216.

In an H.264 implementation, the motion vectors 208, derived according to an MPEG-4 encoding scheme, are used in the H.264 motion compensation block 218 to produce a prediction block by using a six-tap filter (e.g., a six-tap finite impulse response filter) on six (6) adjacent pixels, for half pel motion vectors. The H.264 motion compensation block 218 is discussed further in conjunction with FIGS. 3 and 4, below. In data packing block 220, data from the motion compensation block 218 is packed (arranged) in a manner that allows it to be readily used in the next stage of processing (e.g., downstream data processing block 222). Data packing block 220 can also act to control the flow of data to block 222. In block 222, the transformation, quantization, inverse transformation and inverse quantization processes referred to above are performed using a combination of software and hardware under control of MPU 12, producing ultimately a reconstructed frame 224 that can be used to encode other frames.

Continuing with reference to FIG. 2, in the motion estimation block 206, the motion vectors 208 may be determined to an accuracy of a half pixel (half pel). A motion vector consists of an x-component and a y-component, either or both of which may be accurate to a half pel. For example, a vector with an x-component of 5.5 means that the motion of the block (measured relative to a corresponding block in a reference frame) is between five (5) and 6 pixels in the x-direction. More specifically, the vector component is determined by taking the average of two (2) pixels: the pixel associated with the 5-pixel distance and the pixel associated with the 6-pixel distance. This is referred to as a 2-tap finite impulse response (FIR) filter, due to the operation on 2 pixels to obtain the measure of the pixel in between. Thus, the motion vectors 208 are determined using a 2-tap filter and have an accuracy up to a half pel. Although capable of half pel accuracy, there may be instances in which the motion vector components are full pel values. Furthermore, downstream processing block 222 can be used to determine quarter pel motion vectors by averaging the half pel values.

Figure 3:
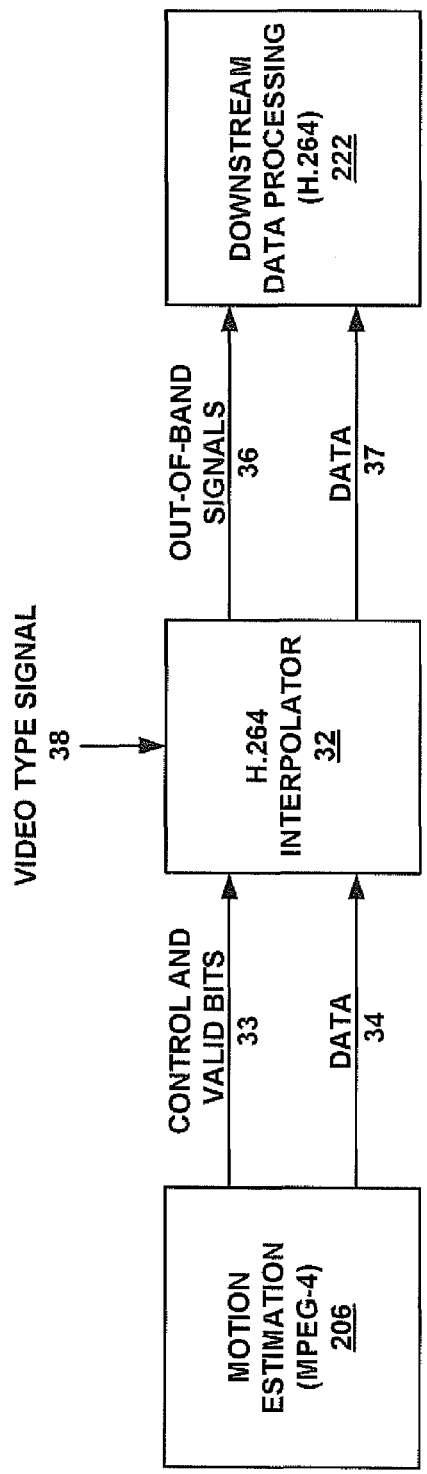
FIG. 3 is a block diagram of a system for encoding data according to one embodiment of the present invention.

FIG. 3 is a block diagram showing the flow of information from the motion estimation block 206 to the H.264 interpolator 32 (representing blocks 218 and 220 of FIG. 2), and then to downstream data processing block 222 for further processing (e.g., transformation, etc., as previously described herein). The information input to the H.264 interpolator 32 includes control and valid bits 33 that correspond to the data 34 flowing from the MPEG-4 pipeline. The data 34 includes macroblock data for the reference and current frames. The control bits, for example, mark the beginning and end of macroblocks and frames. A valid bit can be included to mark pipelines that contain valid data. The control and valid bits 33 are also used to control the luma and chroma memory read engines in the motion compensator 218 of H.264 interpolator 32. Furthermore, the control and valid bits 33 are used by the data packer 220 to pack the output data that is sent to block 222.

In the present embodiment, H.264 interpolator 32 also receives a signal 38 indicating the data type (e.g., current frame or reference frame).

The information output from the H.264 interpolator 32 includes out-of-band signals 36 and data 37. The data 37 includes a stream of motion-compensated pixel values corresponding to the pixels on the display screen 13 (FIG. 1). The data 37 also includes the motion vectors 208 of FIG. 2. Each pixel value represents the filtered values of the pixels. If the motion vectors 208 are non-zero, then the data 37 is a function of the motion vectors; if the motion vectors 208 are zero, data is passed through the H.264 interpolator 32.

Figure 7:
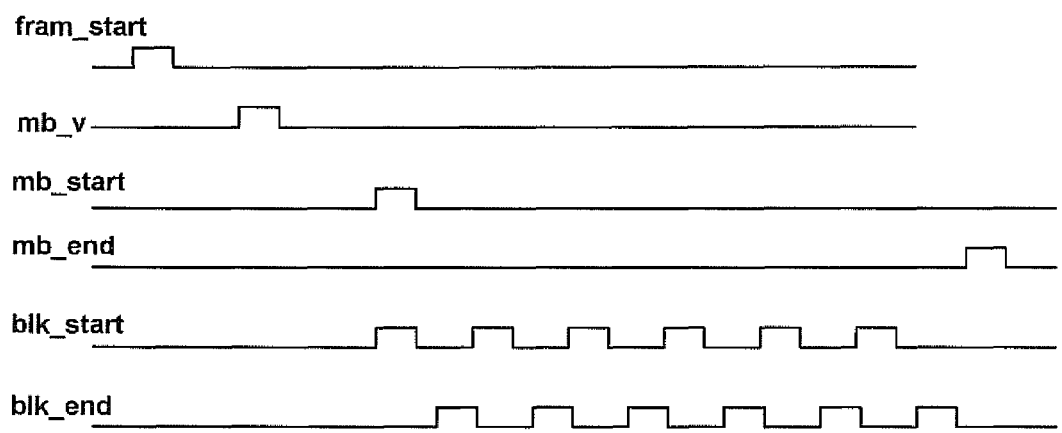
FIG. 7 illustrates a signal protocol according to one embodiment of the present invention.

The out-of-band signals 36 of FIG. 3 identify, for example, the start and end of blocks and macroblocks, the start of a frame, and the last macroblock of the frame. A data valid bit can also be sent. FIG. 7 shows one embodiment of a signal protocol for the out-of-band signals 36.

Figure 4:
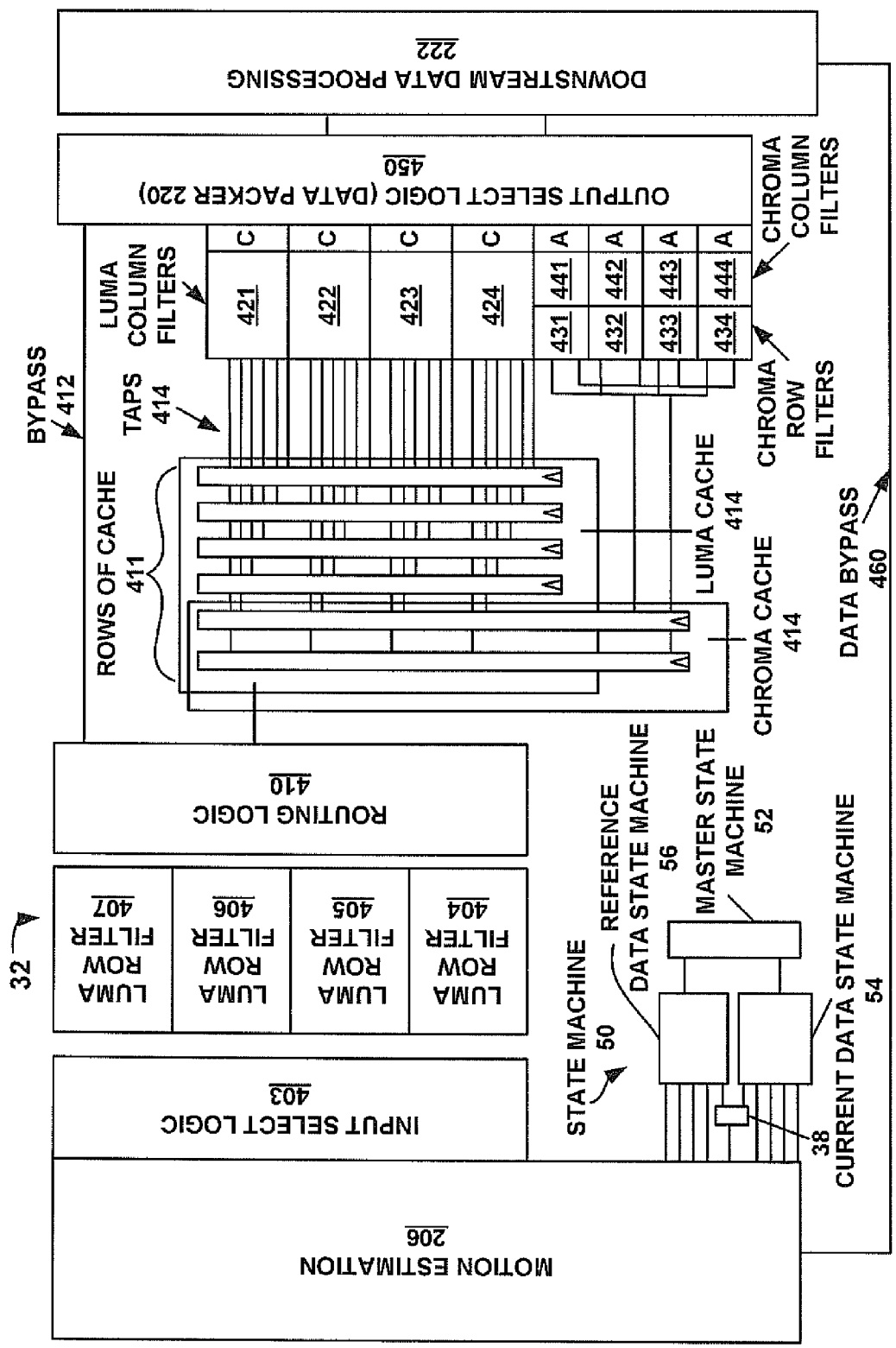
FIG. 4 is a block diagram showing additional details of the system of FIG. 3 according to one embodiment of the present invention.

FIG. 4 is a block diagram of an H.264 interpolator 32 according to one embodiment of the present invention. In the present embodiment, H.264 interpolator 32 includes motion compensation block 218 and data packing block 220 of FIG. 2. In overview, in one embodiment, H.264 interpolator 32 includes a circular data cache with data replication logic, a state machine 50 that controls the operation of the H.264 interpolator 32, a hardware control structure that is used to fetch memory words from system memory 14 (FIG. 1), a data path that is used to apply interpolation filters to the data, and an output unit (output select logic 450) that packs the data and writes the results to the next unit (downstream data processing block 222). Output select logic 450 is analogous to the data packer 220 of FIG. 2. The state machine 50 is discussed in conjunction with FIG. 5, below.

In the following discussion of the H.264 interpolator 32 of FIG. 4, reference is made to buffers, caches and the like. These memory elements may reside in system memory 14 of FIG. 1, in a separate memory unit coupled to the H.264 interpolator 32, or within the interpolator 32. Furthermore, for clarity of illustration, some details are not included in FIG. 4 (e.g., multiplexers may not be shown). Also, FIG. 4 is discussed in the context of, for example, number of bits, number of filters, number of buffers, and the like. Although discussed in the context of these specific examples, the present invention is not so limited.

The data path through H.264 interpolator 32 includes a data pipeline and a control pipeline. The data and control pipelines contain bypass multiplexers that are used to forward data from the current pipe stage to a subsequent pipe stage; that is, data can jump past a pipe stage. The multiplexers that control the flow through the data and control pipelines are controlled by the same multiplexer select signals. Multiplexer bypass operations are controlled by the motion vectors 208 (FIG. 2) and the data type 38 (e.g., current or reference frame; see FIG. 3).

Continuing with reference to FIG. 4, the control and valid bits that flow through the control pipeline correspond to the data flowing through the same pipe stage in the data pipeline. The control bits mark the beginning and end of macroblocks and frames. A valid bit is included to mark pipelines that contain valid data. The control and valid bits are used to control the luma and chroma memory read engines (e.g., input select logic 403) and to pack the data that is sent to the downstream data processing block 222.

In one embodiment, each plane of the reference frame 204 (FIG. 2) is stored in a circular buffer in system memory 14 (FIG. 1). For each 8×8 quadrant of a 16×16 pixel macroblock, there exists an already computed motion vector. For each quadrant, the block's upper-left and lower-right coordinates are summed with the motion vector, and the result is clipped to the boundaries of the reference frame. The resulting coordinates are then projected onto the circular buffers in system memory 14 (FIG. 1). If the coordinates "wrap" around the buffer (see FIG. 6), two memory fetches are executed per color channel per quadrant. If the coordinates do not wrap, only one memory fetch is needed. The size of each fetch ranges from 1×1 to 13×13 pixels, depending on, for example, whether the fetch is a luma or chroma fetch, whether or not the coordinates are wrapped around the circular buffer, and whether or not the motion vectors are half pel.

The H.264 interpolator block 32 of FIG. 4 is coupled to current and reference data caches, which contain 14-bit pixel values. The H.264 interpolator 32 is controlled by an upstream unit (e.g., motion estimation block 206) that signals when there is valid data. The H.264 interpolator 32 reads data according to the input select logic 403. As the fetched data returns from memory 14, it is cached in several buffers. There are four buffers per channel. The luma buffers are each 13×13 pixels (eight bits per pixel), and the chroma buffers are each 5×5 pixels (eight bits per pixel). Data for each quadrant that required two fetches is stitched into a single buffer. Furthermore, the data is automatically boundary-extended (e.g., using boundary mirroring of available pixels, in essence repeating the edge pixels out beyond the boundary) to compensate for any clipping that occurred during fetching. The fetches from system memory 14 are pipelined with the interpolation process of the H.264 interpolator 32.

The H.264 interpolator 32 reads data for the reference frame (e.g., reference frame 204 of FIG. 2) from the buffers. For the luma channel of each 8×8 quadrant in the reference frame, the H.264 interpolator 32 reads eight or 13 rows of eight or 13 eight-bit pixels from a buffer. For each chroma channel of each 8×8 quadrant in the reference frame, the H.264 interpolator 32 reads four or five rows of four or five eight-bit pixels from a buffer. Whether the buffers were populated with multiple fetches or whether boundary extension was used is transparent to the H.264 interpolator 32.

The H.264 interpolator 32 of FIG. 4 reads data for the current frame (e.g., input frame 202 of FIG. 2) from the buffers. For the luma channel of each 8×8 quadrant of the current frame, the H.264 interpolator 32 reads eight rows of eight eight-bit pixels from a buffer. For each chroma channel of each 8×8 quadrant in the current frame, the H.264 interpolator 32 reads four rows of four eight-bit pixels from a buffer.

The data is processed using the luma row filters 404, 405, 406 and 407, the luma column filters 421, 422, 423 and 424, the chroma row filters 431, 432, 433 and 434, and the chroma column filters 441, 442, 443 and 444. With four filters in each stage, four pixels can be handled at a time. Each of these filters is a six-tap FIR filter that implements the kernel [1 −5 20 20 −5 1]/32 and produces an eight-bit output. The luma filters 404-407 and 421-424 each have six 14-bit inputs. Each respective pair of chroma filters 431-434 and 441-444 has two-by-five 14-bit inputs. That is, there are four chroma filters, each of which includes a row filter and a respective column filter. Thus, for example, one chroma filter includes chroma row filter 431 and chroma column filter 441, another such pair includes chroma row filter 432 and chroma column filter 442, and so on.

Each luma and chroma operation is controlled by the motion vectors 208 (FIG. 2) associated with the macroblock data. If the motion vector is zero, then the filter operations are bypassed (data bypass 460) instead of multiplying the data by zero.

The operations in the x-direction (e.g., row) and in the y-direction (e.g., column) can be decoupled, so that operations can first proceed on the rows and then on the columns. The luma filter operations are split into an x-component filter operation before the cache 411 and a y-component filter operation after the cache 411. If the x-component of the motion vector is zero, then the luma data bypasses (bypass 412) the luma row filters 404-407 using a bypass multiplexer (routing logic 410) instead of multiplying by zero. If the x-component of the motion vector is non-zero (e.g., one), then the data is filtered by the luma row filters 404-407. The results are selected by the routing logic 410 and placed in luma cache 414.

The cache 411 has six rows that are shared by the luma column filters 421-424, the chroma row filters 431-434, and the chroma column filters 441-444. The first two rows have five 14-bit pixel words and constitute chroma cache 412 coupled to the chroma row filters 431-434 and the chroma column filters 441-444. The next four rows have four 14-bit pixel words and constitute luma cache 414 coupled to the luma column filters 421-424.

Each row of the cache 411 is connected to the next row. At the start of a macroblock the data cache 411 is empty, but is filled as data is fetched and processed by the luma row filters 404-407. Results from the luma row filter operations are loaded into the first row of the cache 411. In each clock cycle in which the cache 411 is enabled, the data is shifted down into the next row of the cache 411. The data is fed to the luma column filters 421-424, the chroma row filters 431-434, and the chroma column filters 441-444.

The luma column filters 421-424 use the y-component of the motion vectors to filter the data. Downstream of the luma column filters 421-424 are luma clipping blocks labeled "C" in FIG. 4.

The chroma filters 431-434 and 441-444 use the x-component of a motion vector to select and apply the first stage (e.g., a row filter) of the chroma filter operation, and then use the y-component of the motion vector to select and apply the second stage (e.g., a column filter) of the chroma filter operation. Each chroma filter implements the equation:

$$\text{pixel-out} = (a*E) + (b*F) + (c*G) + (d*H);$$

where a=(4−xfrac), b=xfrac, c=(4−xfrac) and d=xfrac for the first stage of the filter; and where a=(4−yfrac), b=(4−yfrac), c=yfrac and d=yfrac for the second stage of the filter. E, F, G and H represent the 4 input pixels, and xfrac and yfrac represent the lower 2 bits of the x-component and y-component, respectively, of the motion vector. The result of this relation is rounded up by adding 8, and the result is right-shifted 4 bits in the block labeled "A" in FIG. 4.

With reference to FIGS. 2 and 4, the output unit (output select logic 450, which is analogous to the data packer 220) packs the data from luma and chroma filters in a manner that allows the data to be readily used in the next stage (e.g., downstream data processing block 222). In one embodiment, a 4×4 block of pixel data for the reference frame (e.g., reference frame 204) is followed by a 4×4 block of pixel data for the current frame (e.g., input frame 202). In this manner, data for the reference frame is interleaved with data for the current frame. This can facilitate the processing of the data by the downstream data processing block 222, because block 222 thus has at least a portion of the two sets of data needed to produce a corresponding portion of reconstructed frame 224. In other words, instead of outputting the entire reference frame followed by the entire current frame, a portion of each is output, allowing block 222 to operate on that portion.

Figure 5:
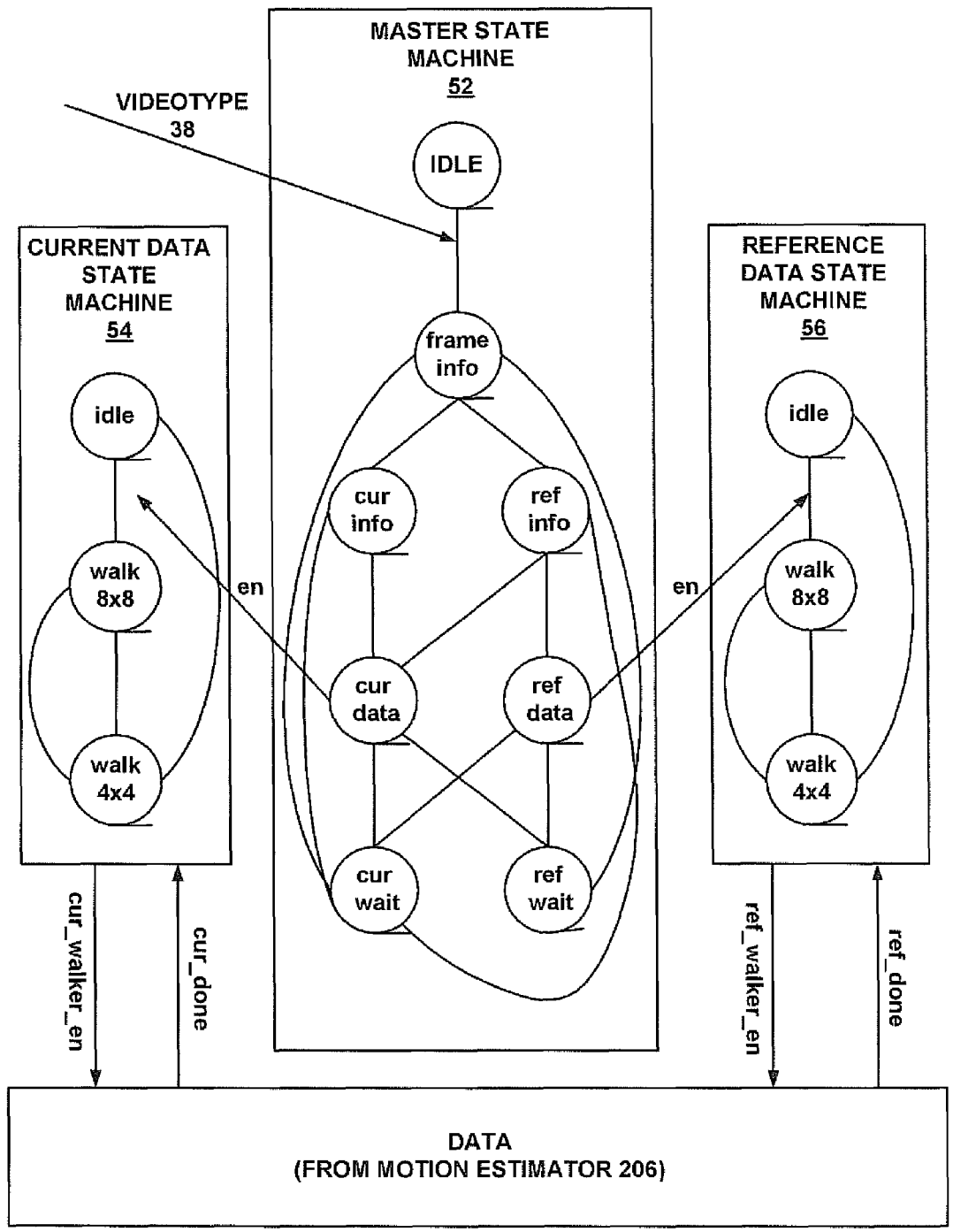
FIG. 5 illustrates a state diagram according to one embodiment of the present invention.

FIG. 5 illustrates a state machine 50 for controlling the operation of the H.264 interpolation block 32, according to one embodiment of the present invention. In the present embodiment, state machine 50 includes master state machine 52 and two state sub-machines: a current data state machine 54 and a reference data state machine 56. The H.264 interpolator 32 (FIG. 4) may work on either the data for the current frame 202 or a reference frame 204 (FIG. 2) according to the signal 38, and the appropriate state submachine 54 or 56 is enabled ("en") by the master state machine 52 to control and execute the system memory fetches and the memory buffer reads discussed in conjunction with FIG. 4. The state machines 54 and 56 each implement a prescribed logic for "walking" through the 8×8 pixel blocks in a macroblock and the 4×4 blocks of pixels in each 8×8 block.

Figure 6:
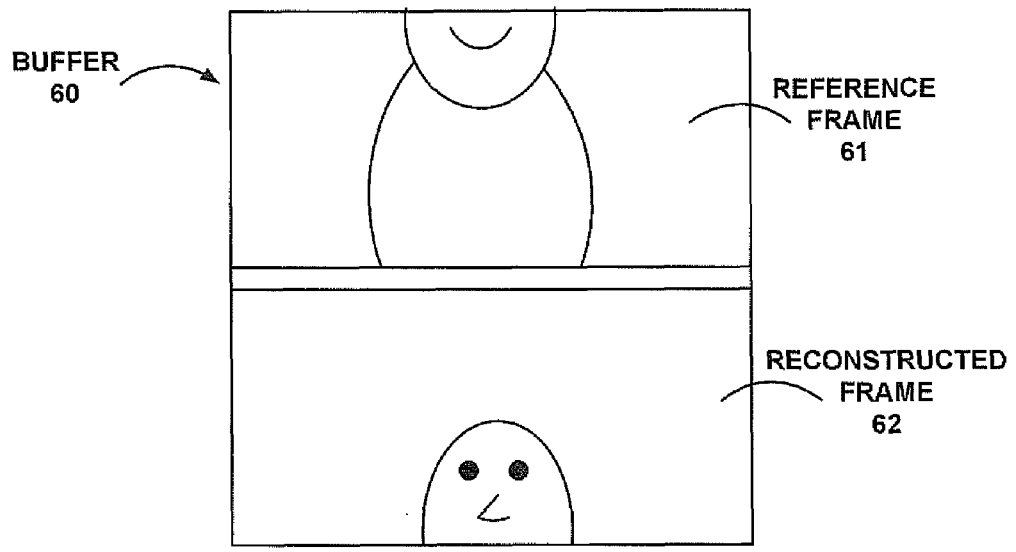
FIG. 6 illustrates a circular buffer to store frame information according to one embodiment of the present invention.

FIG. 6 illustrates the use of a circular buffer 60 to store frame information according to one embodiment of the present invention. In this embodiment, the buffer 60 is used to hold a portion of a reference frame 61 and a portion of a reconstructed frame 62 that can be subsequently used as a reference frame. As the reconstructed frame 62 is read into the buffer 60, it replaces data for the reference frame 61 that has been previously fetched. In the example of FIG. 6, as the reconstructed frame 62 is read into the buffer 60, it will reach the bottom of the buffer, at which point the data will start to be read into the top of the buffer. As a result, when the reconstructed frame 62 is subsequently fetched, two fetches may be required in some instances (when the data to be fetched is stored at both the bottom and top of the buffer 60). The buffer 60 reduces the amount of memory resources needed; however, the present invention is not limited to the use of a circular buffer.

FIG. 7 shows a signal protocol for the out-of-band signals 36 (FIG. 3) according to one embodiment of the present invention. Signals illustrated in FIG. 7 include "frame_start" indicating the start of a frame, "mb_v" indicating a macroblock is valid, "mb_start" indicating the start of a macroblock, "mb_end" indicating the end of a macroblock, "blk_start" indicating the start of a block, and "blk_end" indicating the end of a block.

Figure 8:
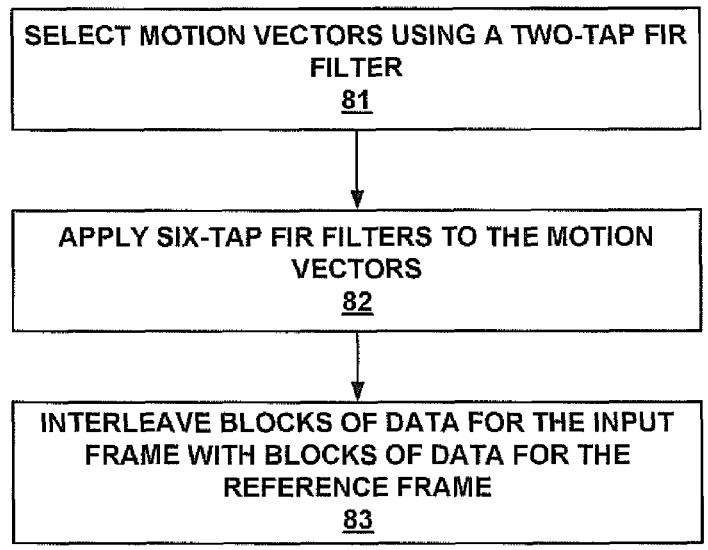
FIG. 8 is a flowchart of a computer-implemented method for processing data according to one embodiment of the present invention.

FIG. 8 is a flowchart 80 of an example of a method for processing data according to one embodiment of the present invention. Although specific steps are disclosed in flowchart 80, such steps are exemplary. That is, the present invention is well-suited to performing various other steps or variations of the steps recited in flowchart 80. It is appreciated that the steps in flowchart 80 may be performed in an order different than presented and that the steps in flowchart 80 are not necessarily performed in the sequence illustrated. In general, the steps in flowchart 80 are by MPU 12 of FIG. 1.

In block 81 of FIG. 8, motion vectors are selected using a two-tap finite impulse response (FIR) filter. The motion vectors are generated according to a first encoding scheme using a block of an input frame of video data and a block of a reference frame of video data. In one embodiment, the first encoding scheme is an MPEG-4 encoding scheme.

In block 82, six-tap FIR filters are applied to the motion vectors to calculate half pel interpolated pixels according to a second encoding scheme that is different from the first encoding scheme. In one embodiment, the second encoding scheme is an H.264 encoding scheme.

In one embodiment, the x-component of a luma channel of the video data are operated on using a plurality of luma row six-tap FIR filters. A result from the plurality of luma row filters is loaded into a first row of a cache. A result already residing in the first row is shifted to a second row of the cache.

Furthermore, in one embodiment, the x-component of a chroma channel of the video data is operated on using a plurality of chroma row six-tap FIR filters, the y-component of the chroma channel is operated on using a plurality of chroma column six-tap FIR filters, and the y-component of the luma channel is operated on using a plurality of luma column six-tap FIR filters.

In block 83, a data packer interleaves blocks of video data for the input frame with blocks of video data for the reference frame.

Embodiments of the present invention are thus described. While the present invention has been described in particular embodiments, it should be appreciated that the present invention should not be construed as limited by such embodiments.

What is claimed is:

1. A system for processing video data, said system comprising:
    a motion estimator operable for comparing a block of an input frame of video data and a block of a reference frame of video data to generate motion vectors according to a first encoding scheme, wherein said motion vectors are generated using a two-tap finite impulse response (FIR) filter, said motion vectors indicating the position of said block of said input frame relative to the position of said block of said reference frame;
    a first encoder coupled to said motion estimator, said first encoder operable for receiving said motion vectors generated using said two-tap filter from said motion estimator and for using said motion vectors generated using said two-tap filter to produce a reconstructed first version of said block of said input frame according to said first encoding scheme; and
    a second encoder coupled to said motion estimator, said second encoder operable for receiving said motion vectors generated using said two-tap filter from said motion estimator and for using said motion vectors generated using said two-tap FIR filter to produce a reconstructed second version of said block of said input frame according to a second encoding scheme that is different from said first encoding scheme, wherein said second encoder comprises a plurality of six-tap FIR filters configured to use said motion vectors generated using said two-tap FIR filter as inputs to generate half pel interpolated pixels for said reconstructed second version.

2. The system of claim 1 wherein said second encoder further comprises a circular buffer operable for concurrently storing both said block of said reference frame and said reconstructed second version of said block of said input frame.

3. The system of claim 1 wherein said second encoder further comprises a data packer operable for interleaving blocks of video data for said input frame and blocks of video data for said reference frame.

4. The system of claim 1 wherein said second encoder further comprises a digital signal processor operable for executing a plurality of software-based instructions that implement encoding operations, said encoding operations comprising transformation and quantization of a residual comprising a difference between said input frame and said reference frame, said encoding operations further comprising inverse quantization and inverse transformation of said residual.

5. The system of claim 1 wherein said second encoder comprises a plurality of luma row filters for operating on the x-component of a luma channel of said video data.

6. The system of claim 5 wherein said second encoder further comprises a cache that is coupled to said plurality of luma row filters, wherein for each clock cycle in which said cache is enabled a result from said plurality of luma row filters is loaded into a first row of said cache and a result already residing in said first row is shifted to a second row of said cache.

7. The system of claim 6 wherein said second encoder further comprises:
 a plurality of chroma row filters for operating on the x-component of a chroma channel of said video data;
 a plurality of chroma column filters for operating on the y-component of said chroma channel; and
 a plurality of luma column filters for operating on the y-component of said luma channel;
 wherein both said plurality of chroma row filters and said plurality of chroma column filters are coupled to both said first row and said second row of said cache and wherein each luma column filter of said plurality of luma column filters is coupled to each row of said cache.

8. The system of claim 1 wherein said first encoding scheme comprises an encoding scheme substantially compliant with MPEG-4 and said second encoding scheme comprises an encoding scheme substantially compliant with H.264.

9. A method for processing video data, said method comprising:
 selecting motion vectors that are generated using a two-tap finite impulse response (FIR) filter, wherein said motion vectors are generated according to a first encoding scheme that compares a block of an input frame of video data and a block of a reference frame of video data, said motion vectors indicating the position of said block of said input frame relative to the position of said block of said reference frame;
 receiving, at a first encoder, said motion vectors generated using said two-tap filter, said first encoder operable for using said motion vectors to produce a reconstructed first version of said block of said input frame according to said first encoding scheme; and
 applying, with a second encoder, six-tap FIR filters to said motion vectors generated using said two-tap FIR filter, said six-tap FIR filters using said motion vectors as inputs to calculate half pel interpolated pixels to produce a reconstructed second version of said block of said input frame according to a second encoding scheme that is different from said first encoding scheme.

10. The method of claim 9 further comprising concurrently storing both said block of said reference frame and said reconstructed second version of said block of said input frame in a circular buffer.

11. The method of claim 9 further comprising interleaving blocks of video data for said input frame and blocks of video data for said reference frame.

12. The method of claim 9 further comprising:
 operating on the x-component of a luma channel of said video data using a plurality of luma row six-tap FIR filters;
 loading a result from said plurality of luma row filters into a first row of a cache; and
 shifting a result already residing in said first row to a second row of said cache.

13. The method of claim 12 further comprising:
 operating on the x-component of a chroma channel of said video data using a plurality of chroma row six-tap FIR filters;
 operating on the y-component of said chroma channel using a plurality of chroma column six-tap FIR filters; and
 operating on the y-component of said luma channel using a plurality of luma column six-tap FIR filters.

14. The method of claim 9 wherein said first encoding scheme comprises an encoding scheme substantially compliant with MPEG-4 and said second encoding scheme comprises an encoding scheme substantially compliant with H.264.

15. A system for processing video data, said system comprising:
 a motion estimator operable for comparing a block of an input frame of video data and a block of a reference frame of video data to generate motion vectors according to a first encoding scheme, wherein said motion vectors are generated using a two-tap finite impulse response (FIR) filter, said motion vectors indicating the position of said block of said input frame relative to the position of said block of said reference frame;
 a first motion compensator coupled to said motion estimator, said motion compensator comprising a first encoder operable for using said motion vectors to produce a reconstructed first version of said block of said input frame according to said first encoding scheme;
 a second motion compensator coupled to said motion estimator, said second motion compensator comprising a second encoder comprising a plurality of six-tap filters and operable for using said motion vectors generated using said two-tap FIR filter to produce a reconstructed second version of said block of said input frame, said reconstructed second version produced according to a second encoding scheme that is different from said first encoding scheme, wherein said second encoder comprises a plurality of six-tap FIR filters configured to use said motion vectors generated using said two-tap FIR filter as inputs to generate half pel interpolated pixels for said reconstructed second version; and
 a data packer coupled to said second motion compensator, said data packer operable for interleaving blocks of video data for said input frame with blocks of video data for said reference frame.

16. The system of claim 15 wherein said second motion compensator further comprises a circular buffer operable for concurrently storing both said block of said reference frame and said reconstructed second version of said block of said input frame.

17. The system of claim 15 further comprising a digital signal processor coupled to said data packer and operable for executing a plurality of software-based instructions that implement encoding operations, said encoding operations comprising transformation and quantization of a residual comprising a difference between said input frame and said reference frame, said encoding operations further comprising inverse quantization and inverse transformation of said residual.

18. The system of claim 15 further comprising:
 a plurality of luma row filters for operating on the x-component of a luma channel of said video data;
 a cache coupled to said plurality of luma row filters, wherein for each clock cycle in which said cache is enabled a result from said plurality of luma row filters is loaded into a first row of said cache and a result already residing in said first row is shifted to a second row of said cache;

a plurality of chroma row filters for operating on the x-component of a chroma channel of said video data;

a plurality of chroma column filters for operating on the y-component of said chroma channel; and a plurality of luma column filters for operating on the y-component of said luma channel, wherein both said plurality of chroma row filters and said plurality of chroma column filters are coupled to both said first row and said second row of said cache and wherein each luma column filter of said plurality of luma column filters is coupled to each row of said cache.

19. The system of claim 1 wherein said second encoder comprises a data bypass, wherein if said motion vectors are zero then said operations of said six-tap FIR filters are bypassed.

20. The system of claim 1 wherein second encoder receives a signal that indicates data is for said reconstructed second version of said block of said input frame and that enables a state machine that controls and executes memory fetches and memory buffer reads for said second encoder.

* * * * *